April 27, 1926.

E. BUCKINGHAM 1,582,632

WORM WHEEL GENERATING MACHINE

Filed March 5, 1924  2 Sheets-Sheet 1

INVENTOR
E. Buckingham
BY
Joseph N. Schofield
ATTORNEY

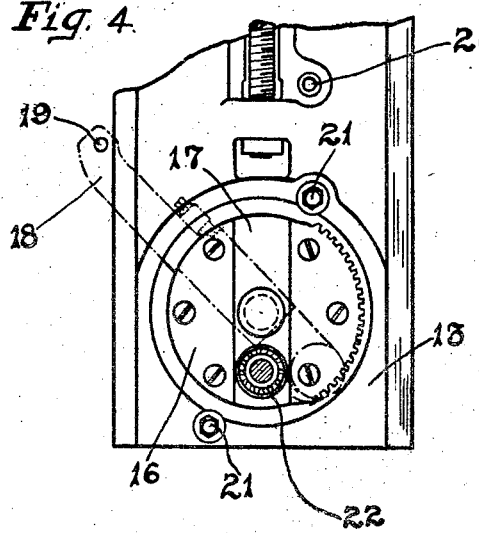
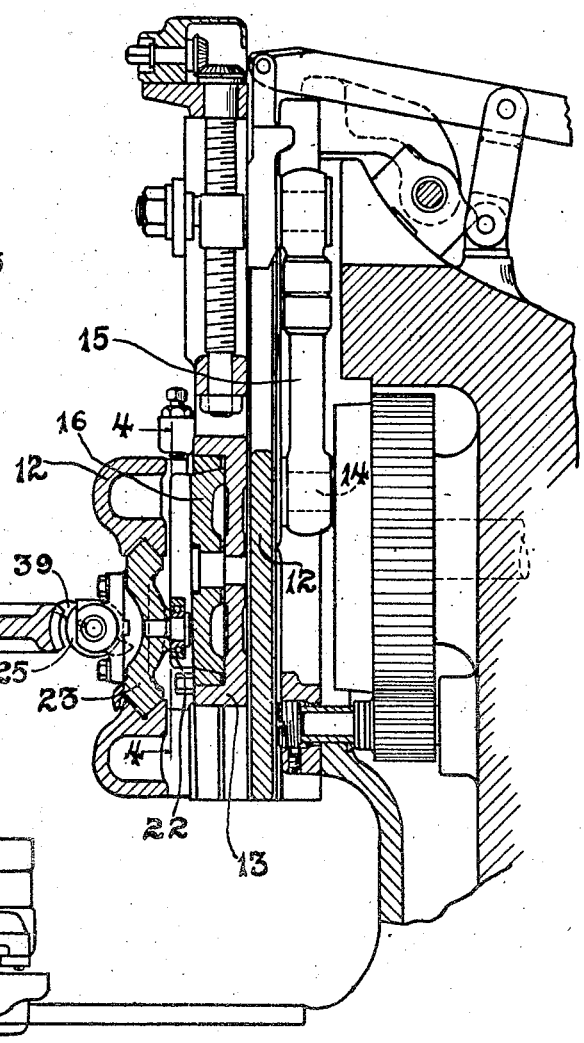
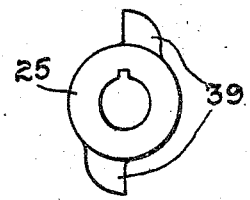

Patented Apr. 27, 1926.

1,582,632

UNITED STATES PATENT OFFICE.

EARLE BUCKINGHAM, OF HARTFORD, CONNECTICUT, ASSIGNOR TO PRATT & WHITNEY COMPANY, OF NEW YORK, N. Y., A CORPORATION OF NEW JERSEY.

WORM-WHEEL-GENERATING MACHINE.

Application filed March 5, 1924. Serial No. 697,042.

*To all whom it may concern:*

Be it known that I, EARLE BUCKINGHAM, a citizen of the United States, residing at Hartford, in the county of Hartford and State of Connecticut, have invented certain new and useful Improvements in Worm-Wheel-Generating Machines, of which the following is a specification.

This invention relates to gear generating machines and in particular to a machine for generating the tooth curves of a worm wheel. More particularly, the present invention relates to an attachment adapted to be associated with a gear planing machine whereby the machine may be utilized to generate precision worm wheels.

An object of the present invention is to provide an attachment adapted to be used in connection with a special form of machine for generating spur and helical gears whereby this machine may be adapted to generate accurately formed worm wheels.

Another object of the invention is to generate the tooth curves of a worm wheel by means of a rotatable and axially movable cutter of simple form, the teeth of the worm wheel being generated by a rolling movement of the blank to successive closely adjacent positions between operative movements of the cutter.

Another object of the invention is to utilize the ram motion of a gear generating or planing machine to actuate the cutter and to utilize the table movements of the machine for properly actuating the work in timed relation to the movements of the cutter, and for indexing the blank.

Particularly, it is an object of the invention to utilize the mechanism described in the patent to Maag, 1,290,270 for making precision worm wheels upon a generating process.

With these and other objects in view, my invention consists in the features of construction and operation set forth in the following specification and illustrated in the accompanying drawings.

In the drawings annexed hereto and forming a part of this specification, I have shown my invention embodied in an attachment mounted on a gear generating machine of particular form, but it will be understood that the invention can be otherwise embodied and that the drawings are not to be construed as defining or limiting the scope of the invention, the claims appended to this specification being relied upon for that purpose.

Figure 2:
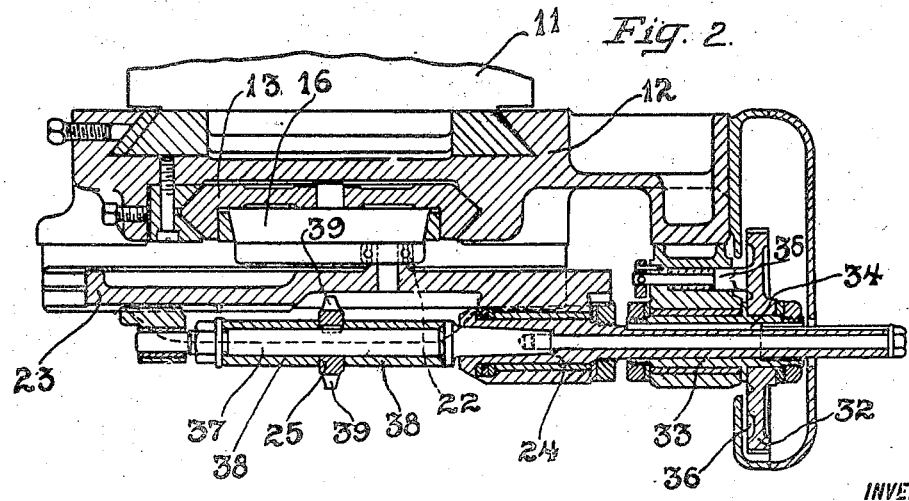
Fig. 2 is a horizontal sectional view taken on line 2—2 of Fig. 1.

Fig. 2ª is a side view of the cutter used in the present invention.

Fig. 3 is a vertical sectional view of the attachment taken centrally thereof and showing the work in operative position relative thereto, and Fig. 4 is a detail view taken on line 4—4 of Fig. 3.

Briefly, my invention in its broadest aspect comprises the following principal parts: first, a body member adapted to be secured to the forward vertical surface of the column of a gear shaper within which a vertically movable ram is adapted to operate; second, a rotatably adjustable member movable with the ram and having a groove extending diametrically across it; third, a slide mounted horizontally in said body member and having a roller, or other member, engaging the groove in the adjustable member so that downward movement of the ram will move the slide horizontally; fourth, a shaft mounted rotatably in the body member and having a pinion thereon in engagement with a rack on the vertically movable ram; fifth, a rotatable cutter shaft on the horizontally movable slide; seventh, gearing connecting the shaft in the body member and the cutter shaft so that the cutter will be rotated simultaneously with its movement axially with the horizontally movable slide; and eighth, a cutter of a particular form mounted on and rotating with the shaft on the horizontally movable slide.

Heretofore it has been the general practice in making worm wheels to cut the teeth by a process of hobbing. According to this process, the blank is constantly rotated about a fixed axis while a rotating cutter, provided with teeth arranged along a helix, engages its periphery. To produce precision worm wheels by this process requires an expensive cutter having a large number of cutting surfaces, closely adjacent each other, each of which must be accurately formed and located upon the required helix. To form these surfaces accurately and to eliminate all errors due to hardening, it is required that the cutting surfaces be accurately ground after hardening. This is an extremely expensive operation and is one of the inherent disadvantages of the hobbing process. This disadvantage is obviated in the use of the present machine by generating the worm wheels with a cutter of simple form which may be quickly and cheaply formed to a high precision.

This cutter, in its preferred form, has but two teeth, the flank portions of which are, or may be, plane, and the teeth are diametrically opposed in position. The cutter is actuated so that it is simultaneously rotated and moved axially, the path of movement of the cutting surfaces therefore being along a helix. By suitable adjustments which may be made to a high precision, the cutter is actuated properly for generating different types and sizes of worm wheels.

The component motions for properly actuating the cutter are two in number and are provided by the downward movement of the vertically movable ram. This movement of the ram induces a simultaneous transverse movement of the horizontally disposed slide and a rotative movement of the cutter mounted on the slide.

Means also are provided for limiting the rotative movement of the cutter to one-half a revolution, which rotation takes place during the downward stroke of the ram. During the upward stroke of the ram, there is no rotation of the cutter but the slide is returned to its original position. A ratchet form of clutch is therefore provided in the driving means for the cutter spindle, and, to give the same rotative movement to this spindle with varying strokes of the ram, change gears are interposed as will be presently described.

Referring more in detail to the drawings, the column 11 of the machine or gear shaper 10 described in the patent to Maag above mentioned has adjustably secured thereto a body member 12. This is provided with a vertically movable slide or ram 13 which is attached to the ram operating means of the gear shaper 10. The means for operating the ram 13 comprise a crank 14 and connecting rod 15, the stroke of the ram or slide 13 being adjustable to any desired amount by means described in the above mentioned patent. This ram or slide 13 in its lower portion carries a circular member 16 in the form of a plate, the rotative position of which may be widely varied. Extending diametrically across this plate is a slot 17. By rotatably adjusting the plate 16, the inclination or obliquity of this slot 17 will be changed. To accurately adjust the member 16, a part thereof is extended at 18 and provided with a stud 19 having an accurately formed cylindrical surface. The distance between this stud 19 on the member 16 and a corresponding stud 20 on the ram or slide 13 enables the angular adjustment of the plate 16 and its slot 17 to be determined to a high degree of precision. To secure the member 16 in adjusted position, clamping screws 21 are provided.

In engagement with the walls of this slot 17 is a roller 22 shown in Fig. 3. This roller 22 is carried upon the rear surface of a horizontally movable slide 23 mounted on the body member 12. Downward movement of the ram 13 will therefore force the transverse slide 23 to move laterally in accordance with the oblique position of the slot 17 in the adjustable member 16. Upward movement of the ram will cause the slide 23 to move in the opposite direction. To increase the transverse movement of the slide 23 relative to the body member 12, it is only necessary to adjust the member 16 to bring the slot 17 more nearly to a horizontal position, and conversely to decrease the movement of the slide 23, the member 16 is adjusted to bring the slot 17 more nearly vertical. By these means, the movement horizontally of the slide 23 is widely varied while the vertical movement of the ram 13 remains constant, or, conversely the slide 23 may be moved through a constant distance by variable downward movements of the ram 13. Adjustments of the ram movement and the slide movement are made for each size or type of worm wheel being generated. On the horizontally movable slide 23 is a shaft 24 or spindle carrying the cutter 25. This spindle 24 is rotated simultaneously with the horizontal movement of the slide 23 in a manner presently to be described.

Figure 1:
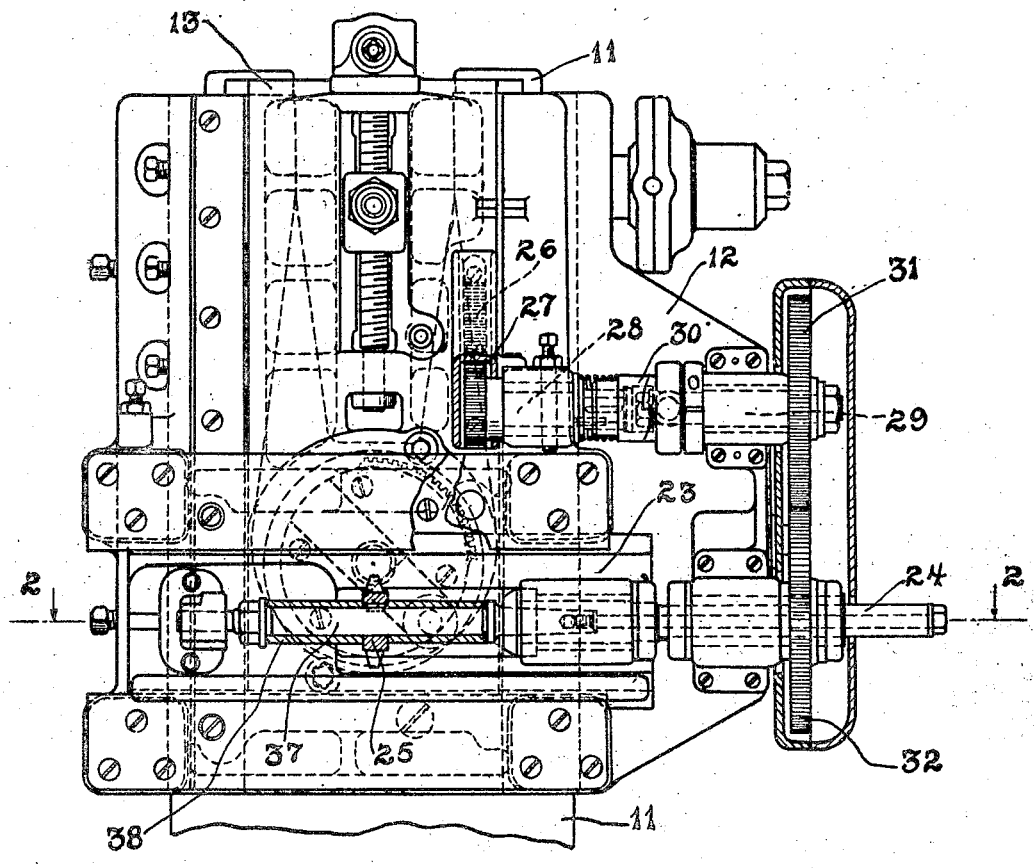
Figure 1 is a front elevation of a portion of a gear generating machine having my attachment applied thereto.

The rotative movement of the cutter 25 and cutter shaft 24 is accomplished by means of a rack 26 fixed to and moving with the ram or vertical slide 13. This rack 26 meshes with a gear 27 on a horizontally disposed shaft 28, the bearing for which is formed in the body member 12 so that it is stationary. With each downward movement of the ram 13, the gear 27 is rotated and serves to rotate a shaft 29 in alignment with the shaft 28 carrying the gear 27 through a toothed clutch 30 shown in Fig. 1. The toothed clutch 30 is so designed that downward movement of the ram 13 will cause rotative movement of the extended shaft 29 but reverse movement of the ram 13 will cause the toothed clutch 30 to slip or ratchet over, one member being longitudinally movable so that no rotative movement of the extended shaft 29 will take place. On the outer end of the extended shaft 29 is a gear 31 meshing with a gear 32 mounted on a sleeve 33 which is rotatable within a suitable bearing in the body member 12. By selecting the proper ratio of gears 31 and 32 between the shaft 29 and sleeve 33, any desired angular movement of the sleeve 33 may be accomplished from the vertical movement of the ram 13.

The sleeve 33 on which the gear 32 is mounted is provided with a keyway or spline 34 and the cutter spindle 24 extends through this sleeve. The connection between the cutter spindle or shaft 24 and the sleeve 33 is therefore such that rotative movement of the sleeve 33 will be imparted to the cutter spindle while the cutter spindle 24 is permitted to move axially, in accordance with movements of the slide 23.

In order to prevent any possibility of retrograde movement of the cutter spindle 24, a spring pressed plunger 35 is mounted adjacent the sleeve 24, as shown in Fig. 2, which engages in suitably formed notches 36 formed on the face of the gear 32. By means of this plunger 35 and the notches 36 in the face of the gear, rotative movement of the gear 29 and the cutter spindle 24 takes place in one direction only.

On the cutter spindle 24 is mounted a cutter arbor 37 which, as shown, may be a suitably formed bar having a taper extension secured within the cutter shaft or spindle 24. On this bar 37 are bushings or spacers 38 between which the cutter 25 is mounted. This cutter 25 as shown may be keyed directly to this bar 37 so that it is forced to rotate therewith. The cutter also, as shown in Fig. 2 and Fig. 2ª, comprises a disk having two toothed projections 39 formed thereon at diametrically opposite points. These teeth 39 are or may be identical with those formed on a hob commonly used for forming worm wheels. The teeth 39 however on the present cutter 25 are diametrically opposite and the cutting surfaces are in exactly the same radial plane but on opposite sides of the axis of the cutter. By the mechanism above described, the combined rotative and axial movement of the cutter induced by movement of the slide 23 and rotation of shaft 24 causes each of the teeth 39 to be actuated in a helical path while it is in engagement with the blank.

The cutter 25 is so placed on its arbor 37 and spindle 24 that when the arm 13 is at the upper limit of its stroke, the teeth 39 stand vertically above and below the spindle axis. The gearing also is so arranged that the downward movement of the ram 13 for each adjustment rotates the cutter 25 through exactly one-half a revolution. The position therefore of the cutter 25 at the end of the downward stroke of the ram 13 is with the teeth 39 directly above and below its axis. In other words, the position of the teeth 39 on the cutter 25 is identical at the beginning and end of each downward stroke of the ram. Also, as there is no rotative movement of the cutter 25 on the upward stroke of the ram 13, the cutter 25 will have its teeth 39 identically positioned for each successive downward stroke of the ram. The gearing for moving the ram 13 and the horizontally movable slide 23 is so chosen that this effect is brought about while the slide 23 is moved the correct amount. The helical path of the teeth 39 may be varied by suitably proportioning the horizontal movement of the slide 23 and the rotative movement of the arbor 37.

In order to actuate the worm wheel A past the cutter 25 and to index it, mechanism which is or may be identical with that described in the Maag patent above mentioned is used. The blank A is in effect rolled upon its pitch circle in a step-by-step manner, between each of these movements of the cutter 25. When the blank A has been rolled a sufficient distance to have one of its tooth spaces completely formed thus generating adjacent sides of successive teeth, the blank A is indexed by traversing it backwardly without rotative movement. During this movement of the blank, the cutter movements are stopped. Then when the combined rotative and axial movements are again imparted to the blank A, another tooth will be operated upon and generated by the cutter 25. This operation is maintained until the teeth of the gear throughout its periphery are completely formed. As these movements of the blank, both during the cutting and indexing operations, are identical to those described in the above-mentioned patent to Maag, further description is thought to be unnecessary. Each of the teeth of the blank A are formed by a large number of cutter movements with the blank in successive closely adjacent positions. These movements of the blank between each movement of the tool during the cutting operations simulate the movement of a blank being rolled along a worm. The movements of the cutter 25 at each cutting stroke simulate the movement of a worm engaging a fixed worm wheel. The spaces cut out by the cutter will therefore correspond to the helically disposed tooth spaces characteristic of worm wheels.

What I claim is:

1. A worm wheel generating machine comprising in combination, a base, a column thereon, a blank supporting and operating table on said base, a cutter supported adjacent said blank and adapted to be simultaneously rotated and advanced axially, means to effect a rolling movement of the blank past the cutter, and means to return the blank to its original position without rolling after a plurality of operative movements of the cutter.

2. A worm wheel generating machine comprising in combination, a base, a column thereon, a blank supporting and operating table on said base, a ram on said column adapted to be reciprocated, a cutter adapted to be rotated and simultaneously moved axially by movement of said ram, means to roll said blank past said cutter during its operation, and means to index said blank.

3. A cutter actuating mechanism for a worm wheel generating machine comprising in combination, a ram, means to reciprocate said ram, a slide adjacent said ram and adapted to be reciprocated by movements thereof, a rotatably mounted cutter on said slide, and means connecting said cutter and ram whereby the cutter will be rotated simultaneously with movement of the slide.

4. A cutter actuating mechanism for a worm wheel generating machine comprising in combination, a ram, means to reciprocate said ram constant distances, a slide adjacent said ram and adapted to be reciprocated variable distances by movement of said ram, a rotatably mounted cutter on said slide, and means connecting said cutter and ram whereby the cutter will be rotated simultaneously with movement of the slide.

5. A cutter actuating mechanism for a worm wheel generating machine comprising in combination, a ram, means to reciprocate said ram, a slide adjacent said ram, a member on said ram engaging a member outstanding from said slide whereby movement of the ram actuates said slide, means to adjust the member on the ram to vary the movement of the slide for each movement of the ram, a rotatably mounted cutter on said slide, and means connecting said cutter and ram whereby the cutter will be rotated simultaneously with movement of the slide.

6. A cutter actuating mechanism for a worm wheel generating machine comprising in combination, a ram, means to reciprocate said ram, a slide adjacent said ram and adapted to be reciprocated by movements thereof, a rotatably mounted cutter on said slide, a rack on said ram engaging a pinion, the axis of which is fixed, and means to rotate said cutter by rotation of said pinion.

7. A cutter actuating mechanism for a worm wheel generating machine comprising in combination, a ram, means to reciprocate said ram, a slide adjacent said ram and adapted to be reciprocated by movements thereof, a rotatably mounted cutter on said slide, a rack on said ram engaging a pinion the axis of which is fixed, and means to rotate said cutter one-half a revolution during the downward movement of the ram.

8. A cutter actuating mechanism for a worm wheel generating machine comprising in combination, a ram, means to reciprocate said ram, a slide adjacent said ram and adapted to be reciprocated by movements thereof, a rotatably mounted cutter on said slide, a rack on said ram engaging a pinion the axis of which is fixed, means to rotate said cutter one-half a revolution during the downward movement of the ram, and means to maintain the rotative movement of the cutter constant for variable movements of the ram.

In testimony whereof, I hereto affix my signature.

EARLE BUCKINGHAM.